(12) United States Patent
Holleman et al.

(10) Patent No.: US 8,954,609 B1
(45) Date of Patent: Feb. 10, 2015

(54) TIME ADJUSTMENT USING TIME-TO-LIVE VALUES

(75) Inventors: Keith E. Holleman, Campbell, CA (US); Murthy Garikiparthi, Fremont, CA (US); Meenakshi Sundaram Subramanian, San Jose, CA (US); DeviPrasad Natesan, San Jose, CA (US); Philip Kruzinski, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 531 days.

(21) Appl. No.: 13/455,817

(22) Filed: Apr. 25, 2012

(51) Int. Cl.
*G06F 15/16* (2006.01)

(52) U.S. Cl.
USPC ............................. 709/248; 709/203; 709/227

(58) Field of Classification Search
CPC ................................................ H01L 2012/5674
USPC ............................. 709/248, 203, 227; 370/350
See application file for complete search history.

(56) References Cited

U.S. PATENT DOCUMENTS

| | | | | |
|---|---|---|---|---|
| 7,649,912 | B2 * | 1/2010 | Balasubramanian et al. | 370/509 |
| 7,821,958 | B2 * | 10/2010 | Smith et al. .................. | 370/252 |
| 7,876,790 | B2 * | 1/2011 | Cho et al. ..................... | 370/503 |
| 7,990,909 | B2 * | 8/2011 | Brueckheimer .............. | 370/324 |
| 8,018,972 | B2 * | 9/2011 | Roberts et al. ............... | 370/507 |
| 8,031,747 | B2 * | 10/2011 | Barry et al. .................. | 370/516 |
| 8,270,438 | B2 * | 9/2012 | Barry et al. .................. | 370/516 |
| 8,275,087 | B2 * | 9/2012 | Hadzic et al. ................ | 375/376 |
| 8,300,749 | B2 * | 10/2012 | Hadzic et al. ................ | 375/354 |
| 8,325,616 | B2 * | 12/2012 | Huang et al. ................. | 370/252 |
| 8,391,271 | B2 * | 3/2013 | Mo et al. ...................... | 370/350 |
| 8,416,812 | B2 * | 4/2013 | Radulescu ................... | 370/503 |
| 8,427,963 | B2 * | 4/2013 | Zampetti et al. ............. | 370/242 |
| 8,494,011 | B2 * | 7/2013 | Barry et al. .................. | 370/516 |
| 8,571,008 | B2 * | 10/2013 | Kim et al. .................... | 370/350 |
| 8,588,258 | B2 * | 11/2013 | Le Pallec et al. ............ | 370/516 |
| 8,630,315 | B2 * | 1/2014 | Rivaud et al. ................ | 370/509 |
| 8,670,459 | B2 * | 3/2014 | Barry et al. .................. | 370/464 |

(Continued)

FOREIGN PATENT DOCUMENTS

WO 02076042 A1 9/2002

OTHER PUBLICATIONS

Gaderer, Georg, Patrick Loschmidt, and Thilo Sauter. "Improving fault tolerance in high-precision clock synchronization." Industrial Informatics, IEEE Transactions on 6.2 (2010): 206-215.*

(Continued)

*Primary Examiner* — Jimmy Tran
(74) *Attorney, Agent, or Firm* — Shumaker & Sieffert, P.A.

(57) ABSTRACT

In one example, network device includes a control unit having one or more hardware-based microprocessors and an interface. The interface can receive a first time synchronization message from a master device that comprises a first TTL value. The first TTL value can be indicative of a number of hops traversed by the first time synchronization message. The interface can subsequently receive a second time synchronization message from the master device that comprises a second TTL value that is is indicative of a number of hops traversed by the second time synchronization message. The network device can also include a timing module that determines a time adjustment based at least in part on the determination that the first and second TTL values are different, and applies the time adjustment to update the time of the network device.

34 Claims, 6 Drawing Sheets

(56) References Cited

U.S. PATENT DOCUMENTS

| | | | | |
|---|---|---|---|---|
| 8,730,868 | B2* | 5/2014 | Yamada et al. | 370/324 |
| 8,750,356 | B2* | 6/2014 | Wang | 375/224 |
| 8,812,739 | B2* | 8/2014 | Bryant et al. | 709/248 |
| 8,819,161 | B1* | 8/2014 | Pannell et al. | 709/208 |
| 8,837,532 | B2* | 9/2014 | Miyabe | 370/516 |
| 2001/0028651 | A1 | 10/2001 | Murase | |
| 2006/0245454 | A1* | 11/2006 | Balasubramanian et al. | 370/509 |
| 2009/0034672 | A1* | 2/2009 | Cho et al. | 375/364 |
| 2009/0168808 | A1* | 7/2009 | Cho et al. | 370/503 |
| 2009/0185501 | A1* | 7/2009 | Huang et al. | 370/252 |
| 2010/0158051 | A1* | 6/2010 | Hadzic et al. | 370/503 |
| 2010/0158181 | A1* | 6/2010 | Hadzic | 375/371 |
| 2010/0158183 | A1* | 6/2010 | Hadzic et al. | 375/376 |
| 2010/0284405 | A1 | 11/2010 | Lim | |
| 2010/0329125 | A1* | 12/2010 | Roberts et al. | 370/241.1 |
| 2011/0122775 | A1* | 5/2011 | Zampetti et al. | 370/242 |
| 2011/0150008 | A1* | 6/2011 | Le Pallec et al. | 370/503 |
| 2011/0153869 | A1* | 6/2011 | Bryant et al. | 709/248 |
| 2011/0200051 | A1* | 8/2011 | Rivaud et al. | 370/400 |
| 2012/0170631 | A1* | 7/2012 | Liu | 375/224 |
| 2012/0250704 | A1* | 10/2012 | Yamada et al. | 370/503 |
| 2012/0287948 | A1* | 11/2012 | Ruffini et al. | 370/503 |
| 2012/0300859 | A1* | 11/2012 | Chapman et al. | 375/257 |
| 2013/0039220 | A1* | 2/2013 | Ruffini et al. | 370/255 |
| 2013/0080817 | A1* | 3/2013 | Mihelic | 713/401 |
| 2013/0121351 | A1* | 5/2013 | Miyabe | 370/503 |
| 2013/0155945 | A1* | 6/2013 | Chen | 370/328 |
| 2013/0208735 | A1* | 8/2013 | Mizrahi et al. | 370/503 |
| 2013/0227008 | A1* | 8/2013 | Yang | 709/204 |
| 2013/0259049 | A1* | 10/2013 | Mizrahi | 370/392 |
| 2013/0283174 | A1* | 10/2013 | Faridian et al. | 715/736 |
| 2013/0283175 | A1* | 10/2013 | Faridian et al. | 715/736 |
| 2014/0161143 | A1* | 6/2014 | Mizrahi et al. | 370/503 |
| 2014/0211780 | A1* | 7/2014 | Kang et al. | 370/350 |
| 2014/0226984 | A1* | 8/2014 | Roberts et al. | 398/66 |

OTHER PUBLICATIONS

Weibel, Hans. "High precision clock synchronization according to IEEE 1588 implementation and performance issues." Proc. Embedded World 2005 (2005).*

Lentz, S., and A. Lécroart. "Precision timing in the NEPTUNE Canada network." Oceans 2009-Europe. IEEE, 2009.*

Li Qun, and Daniela Rus. "Global clock synchronization in sensor networks."Computers, IEEE Transactions on 55.2 (2006): 214-226.*

Sundararaman, Bharath, Ugo Buy, and Ajay D. Kshemkalyani. "Clock synchronization for wireless sensor networks: a survey." Ad Hoc Networks 3.3 (2005): 281-323.*

Lenzen, Christoph, Philipp Sommer, and Roger Wattenhofer. "Optimal clock synchronization in networks." Proceedings of the 7th ACM Conference on Embedded Networked Sensor Systems. ACM, 2009.*

Schenato, Luca, and Giovanni Gamba. "A distributed consensus protocol for clock synchronization in wireless sensor network." Decision and Control, 2007 46th IEEE Conference on. IEEE, 2007.*

IEEE-SA Standards Board, Standard for a Precision Clock Synchronization Protocol for Networked Measurement and Control Systems, IEEE Std 1588TM-2008, Instrumentation and Measurement Society, New York, New York, Jul. 24, 2008, 289 pp.

* cited by examiner

TIME ADJUSTMENT USING TIME-TO-LIVE VALUES

TECHNICAL FIELD

This disclosure relates to computer networks and, more particularly, to time synchronization within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other devices.

In many networks, it is important for nodes within the network to have accurate current time information. For example, accurate time information (i.e., time of day) may be necessary for computing timing delays for communicating packets between network nodes. Accurate timing information regarding the transit time of packets may be important to assess network efficiency and to ensure quality of service and performance measures. As an example, mobile handset devices may require microsecond accuracy when communicating simultaneously with multiple base-stations in a 4G mobile network. To correctly assess the timing information, it is important for the current time on all the interconnected computing devices of the network to be accurately synchronized to a primary reference time. The primary reference time may be provided by a primary reference clock source device, such as a GPS.

Typically, one or more server or "master" devices are configured to determine the primary reference time and deliver that time to other client or "slave" devices. Common examples of such client devices include routers within a service provider network. The slave and master devices will typically send and receive time synchronization messages in a synchronization handshake to confirm accurate time synchronization. Some networks use specific synchronization protocols that specify and require a maximum one second round trip delay between delivery of the primary reference time by the server node and response by the slave device in a time synchronization handshake. For example, the IEEE 1588v2 protocol, referred to as Precision Time Protocol (PTP), is used for timing recovery of frequency, phase, and time-of-day over a packet based network. The protocol relies on having a bidirectional symmetric path for packets that flow between a master device and a slave device. In the PTP protocol the client device first determines the network delay between the master and slave devices. After assuming the path between the master and slave devices is symmetric, the slave device then computes the time offset from the master device. A network change that results in a longer/shorter symmetric path or a network change that results in the creation of an asymmetric path between the master and slave device can be problematic for the slave device's ongoing computations and adjustments in attempt to recover time.

SUMMARY

The techniques described herein are directed to time synchronization between a master device and a slave device in a manner that allows the slave device to correlate adjustments in the time of the slave device to changes in the network path between the master and slave devices. Rather than treating changes in the network path between master and slave devices as random events when performing time synchronization, a slave device can use Time-To-Live (TTL) values of time synchronization messages to determine whether the network path between the slave and master devices has changed. In this way, if a change in the network path between the slave and master devices has occurred, the slave device can adjust the time of the slave device based at least in part change in the network path.

According to techniques of the present disclosure, a slave device can monitor TTL values of time synchronization messages received from a master device. When the master device receives a first time synchronization message from the slave device, the master device can send a second time synchronization message back to the slave device. The second message can include TTL value that is indicative of a number of hops traversed by the second message from the master device to the slave device. The slave device can compare the TTL value of the second time synchronization message with previously determined TTL values of time synchronization messages received from the master device. If the TTL value and one or more of the previously determined TTL values are different (e.g., the network path between the slave and master devices has changed), the slave device can modify the magnitude of the adjustment to the time of the slave device to accommodate fewer or more hops in the network path between the slave and master devices. Adjusting the time of a slave device based on the detection of changes in network topology using techniques of the disclosure may improve the accuracy and performance of time synchronization in slave devices. Moreover, in some examples, administrators and automated agents may respond more quickly to non-optimal network conditions when a change in network topology using TTL values has been detected.

In one example, a method includes receiving, by a slave device, a first time synchronization message from a master device that comprises a first TTL value. The first TTL value may be indicative of a number of hops traversed by the first time synchronization message from the master device to the slave device. The method also includes subsequently receiving, by the slave device, a second time synchronization message from the master device that comprises a second TTL value. The second TTL value may be indicative of a number of hops traversed by the second time synchronization message from the master device to the slave device. The method may also include, in response to determining that at least the second TTL value is different than the first TTL value or TTL values of two time synchronization messages that were previously sent from the slave device to the master device are different, determining, by the slave device, a time adjustment based at least in part on the determination that the first and second TTL values are different. The method may also include applying, by the slave device, the time adjustment to update the time of the slave device.

In one example, a network device includes a control unit having one or more hardware-based microprocessors. The network device also includes an interface that receives a first time synchronization message from a master device that comprises a first TTL value, wherein the first TTL value is indicative of a number of hops traversed by the first time synchronization message from the master device to the network device, and subsequently receives a second time synchronization message from the master device that comprises a second TTL value, wherein the second TTL value is indicative of a number of hops traversed by the second time synchronization message from the master device to the network device. The network device also includes a timing module that, in response to determining that at least the second TTL value is different than the first TTL value or TTL values of two time synchronization messages that were previously sent from the network device to the master device are different determines a time adjustment based at least in part on the determination that the first and second TTL values are different, and applies the time adjustment to update the time of the network device.

In one example, a non-transitory computer-readable medium includes instructions that, when executed, cause one or more processors of a network device to receive a first time synchronization message from a master device that comprises a first TTL value, wherein the first TTL value is indicative of a number of hops traversed by the first time synchronization message from the master device to the network device. The non-transitory computer-readable medium also includes instructions that, when executed, cause one or more processors of a network device to subsequently receive a second time synchronization message from the master device that comprises a second TTL value, wherein the second TTL value is indicative of a number of hops traversed by the second time synchronization message from the master device to the network device. The non-transitory computer-readable medium also includes instructions that, when executed, cause one or more processors of a network device to, in response to determining that at least the second TTL value is different than the first TTL value or TTL values of two time synchronization messages that were previously sent from the network device to the master device are different, determine a time adjustment based at least in part on the determination that the first and second TTL values are different and apply the time adjustment to update the time of the network device.

In one example, a method includes receiving, by a master device, a first synchronization message from a slave device that comprises a first TTL value, wherein the first TTL value is indicative of a number of hops traversed by the first time synchronization message from the slave device to the master device. The method also includes, in response to receiving the first synchronization message, sending, by the master device and to the slave device, a second time synchronization message that includes the first TTL value and a second TTL value, wherein the second TTL value is usable by the slave device to determine a number of hops traversed by the second time synchronization message from the master device to the slave device.

In one example, a network device includes a control unit having one or more hardware-based microprocessors. The network device also includes an interface that receives a first synchronization message from a slave device that comprises a first TTL value, wherein the first TTL value is indicative of a number of hops traversed by the first time synchronization message from the slave device to the network device. The network device also includes a timing module that, in response to receiving the first synchronization message, sends, to the slave device, a second time synchronization message that includes the first TTL value and a second TTL value, wherein the second TTL value is usable by the slave device to determine a number of hops traversed by the second time synchronization message from the network device to the slave device.

In one example, a non-transitory computer-readable medium includes instructions that, when executed, cause one or more processors of a network device to receive a first synchronization message from a slave device that comprises a first TTL value, wherein the first TTL value is indicative of a number of hops traversed by the first time synchronization message from the slave device to the network device. The non-transitory computer-readable medium includes instructions that, when executed, cause one or more processors of the network device to, in response to receiving the first synchronization message, send, to the slave device, a second time synchronization message that includes the first TTL value and a second TTL value, wherein the second TTL value is usable by the slave device to determine a number of hops traversed by the second time synchronization message from the network device to the slave device.

The details of one or more aspects of this disclosure are set forth in the accompanying drawings and the description below. Other features, objects, and advantages of this disclosure will be apparent from the description and drawings, and from the claims.

DETAILED DESCRIPTION

Figure 1:
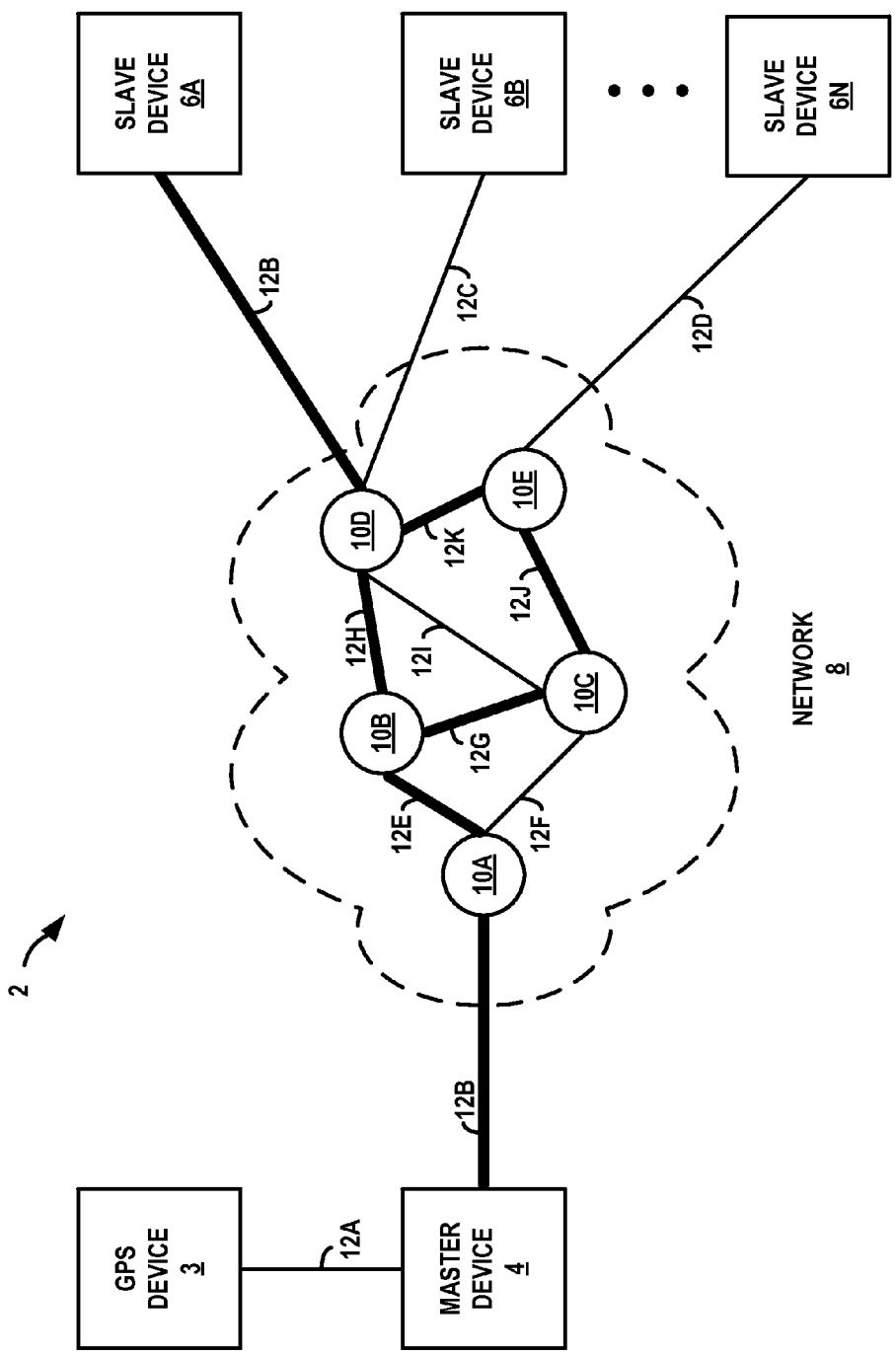
FIG. 1 is a block diagram illustrating an example computing environment in which network nodes are synchronized to a primary reference clock.

FIG. 1 is a block diagram illustrating an example network environment 2 in which network nodes are synchronized to a primary reference clock, in accordance with techniques of the disclosure. While described with respect to routers, the time synchronization techniques described in this disclosure may be implemented by any network device capable of delivering time information.

As shown in FIG. 1, example network environment 2 includes a GPS device 3, master device 4, slave devices 6A-6N, public network 8, and network nodes 10A-10E. In some examples, GPS device 3, master device 4, slave devices 6A-6N, public network 8, and network nodes 10A-10D are operatively and/or communicatively coupled to one another using network links 12A-12K. Network links 12A-12K may be Ethernet, ATM or other network connections.

Slave devices 6A-6N (collectively "slave devices 6") may be any type of device capable of operating within network system 8. For example, slave devices 6 may be network devices, such as network hubs, network switches, network routers, or the like. In some examples, slave devices 6 may be computing devices, such as personal computers, laptop computers, handheld computers, workstations, servers, switches, printers, and the like.

Slave devices 6A-6N may each include an internal clock that reflects a time value, for example, a "time." In some examples, accurate and synchronized time values of internal clocks of slave devices 6 may be useful to improve performance, integrity, security, etc. As one example, mobile handset devices may require microsecond accuracy when communicating simultaneously with multiple base-stations in a 4G mobile network. Consequently, communication between slave devices 6 and base stations may be sensitive to end-to-end delay of network packets. Slave devices 6 may more accurately determine end-to-end delay of network packets when internal clock values of slave devices 6 are synchronized.

Internal clocks of slave devices 6 may become unsynchronized with the master clock of master device 4 due to temperature, age of the internal clocks, frequency rate of the clock, etc. To synchronize internal clocks of slave devices 6, slave devices 6 can communicate over network 8 with master device 4 that includes a master clock. The master clock may an authoritative source of time for slave devices 6. For instance, slave devices 6 may implement one or more time synchronization protocols that enable internal clocks of slave device 6 to synchronize with a master clock of master device 6. Examples of such time synchronization protocols may include Precision Time Protocol, Network Time Protocol, etc. As will be further illustrated in FIG. 2, a slave device, such as slave device 6A and master device 4 may exchange time synchronization messages via network 8 to synchronize the internal clock of slave device 6A with the master clock of master device 4.

As shown in FIG. 1, master device 4 may be any type of device capable of operating within network system 10. For example, master device 4 may be a network device, such as a network hub, network switch, network router, or the like. In some examples, master device 4 may be a computing device, such as a personal computer, laptop computer, handheld computer, workstation, server, switch, or the like. As previously described, master device 4 also includes a master clock, which may be the authoritative source of time for slave devices 6. Consequently, slave devices 6 may exchange time synchronization messages with master device 4, such that internal clocks of slave devices 6 may become synchronized with the master clock of master device 4. To exchange such time synchronization messages, master device 4 may implement one or more time synchronization protocols such as Precision Time Protocol (PTP), Network Time Protocol, etc.

In some examples, master device 4 may synchronize its master clock with GPS device 3. GPS device 3 may be a GPS satellite or a computing device, such as a router, hub, switch, mainframe, desktop computing device, mobile computing device, etc. In the example of FIG. 1, GPS device 3 includes a primary reference clock that serves as an authoritative source of time for the master clock of master device 4. Master clock 4 may synchronize its master clock with the primary reference clock of GPS device 3 using a GPS receiver that is capable of sending and receiving information with GPS device 3. The GPS receiver of GPS device 3 may be hardware or a combination of software and hardware that master device uses to communicate with GPS device 3. Example time synchronization architectures, such as shown in FIG. 1, may be used when the expense of including a GPS time receiver in each slave device is too expensive or if a GPS signal is not accessible to slave devices 6.

When a slave device, such as slave device 6A, performs time synchronization with master device 4 using a time synchronization protocol, such as PTP, time synchronization messages are sent and received by slave device 6A using network 8. Time synchronization messages may include PTP messages, such as a PTP sync message (herein "sync message"), PTP delay request message (herein "delay request message"), PTP delay response message (herein "delay response message"), etc. Network 8 may include network nodes 10, such as network hubs, network switches, network routers that are operatively inter-coupled using network links 12. When slave device 6A sends and receives time synchronization messages, the messages are forwarded by network nodes 10 to and from master device 4.

Conventionally, the Precision Time Protocol (PTP) relies on a bidirectional symmetric path for packets that flow between a master device and a slave device. When a conventional slave device performs a time synchronization using PTP, the slave device first determines the network delay between the master device and the slave device. After assuming the path between the master device and slave device is symmetric, the slave device then computes the time offset from the master device. A change in network topology, however, that results in a longer/shorter symmetric path or the creation of an asymmetric path between the server and master can be problematic for the slave device's ongoing computations and adjustments in its attempts to synchronize time with master device 4. For instance, if a change in network topology increases the number of network hops in the network path between the master and slave devices, the time synchronization message sent by master device may require additional time to reach the slave device. Consequently, the slave device may incorrectly determine that the time value of its internal clock differs from the master clock by a larger amount due to the additional network hops, although the actual difference in time between the master device and the slave device is small. As a result of the delay in the time synchronization message, the slave device may erroneously apply a large time adjustment to its internal clock, which may thereby cause the slave device and master device to become unsynchronized.

In accordance with techniques of this disclosure, slave devices 6 can correlate adjustments in the time of slave devices 6 to changes in that occur in the network topology of network 8, which may improve the accuracy and/or precision of time synchronization. Rather than treating changes in the network path between master device 4 and slave devices 6 as random events when performing time synchronization, a slave device (e.g., slave device 6A), can use Time-To-Live (TTL) values of time synchronization messages to determine whether the network path between the slave device 6A and master device 4 devices has changed. In this way, if a change in the network path between slave device 6A and master device 4 has occurred, slave device 6 can adjust the time value of the internal clock of slave device 6A based at least in part change in the network path.

In operation, slave devices 6 and master device 4 may broadcast announce messages to determine which device will serve as the authoritative source of time. In one example, slave devices 6 and master device 4 each run the Best Master Clock algorithm to determine which device will serve as the authoritative source of time. Further details of the Best Master Clock algorithm as used in PTP can be found in the IEEE 1588™ Standard for A Precision Clock Synchronization Protocol for Networked Measurement and Control Systems.

As will be further described in the following example, slave device 6A uses PTP to exchange time synchronization messages synchronize the time of its internal clock with the time of master device 4. In the example of FIG. 1, slave devices 6 determine that the authoritative source of time is master device 4. Consequently, slave device 6A begins listening for sync messages sent by master device 4 to perform time synchronization. Each sync message may include a time value that is indicative of when the sync message was sent by master device 4 to slave device 6A. Furthermore, each sync message further includes a Time-to-Live (TTL) value. The TTL value can be indicative of the number of hops that a sync message is allowed to traverse along a network path before the sync message is discarded by a network device in the network path. Generally, unrestricted network packets, such as sync messages, are initiated with a TTL value of 255. Under the Internet Protocol (IP) version 4 (v4), the TTL value is included in an 8-bit field of an IPv4 header.

In the example of FIG. 1, master device 4 broadcasts a sync message that may be received by slave device 6A. As the sync message is forwarded by network nodes 10 (e.g., hops) along a network path to slave device 6A, each of network nodes 10 that forwards the sync message decrements the TTL value. In the example of FIG. 1, the sync message may traverse a network path from: master device 4 to network node 10A, network node 10A to network node 10B, network node 10B to network node 10D, and network node 10D to slave device 6A. Consequently, a TTL value of the sync message that is initially 255 when sent by master device 4 may be 252 when received by slave device 6A.

Slave device 6A, upon receiving the sync message, determines the time value of the message. In accordance with techniques of the disclosure, slave device 6A further determines the TTL value of the sync message. Slave device 6A can store the TTL values in a data set for later use to determine a change in network topology as further described below. Upon determining the time value and TTL value of the sync message, slave device 6A generates a delay request message that includes a time value. The time value is indicative of a time that the delay message is sent by slave device 6A to master device 4. Slave device 6A subsequently sends the delay message to master device 4. The delay request message traverses the same network path from slave device 6A to master device 4 that the sync message traversed from master device 4 to slave device 6A. Consequently, the TTL value of the delay request message is 252 when received by master device 4.

In response to receiving the delay request message, master device 4 generates a delay response message that will be sent in return to slave device 6A. Master device 4 includes a time value that is indicative of a time when the delay response message is sent by master device 4 to slave device 6A. In accordance with techniques of the disclosure, master device 4 further determines an initial TTL value of the delay response message (e.g., 255) that may be indicative of the number of hops traversed by the message from master device 4 to slave device 6A. Master device 4 may then send the delay response message to slave device 6A.

In some examples, master device 4 may also include the TTL value of the delay request message in the delay response message along with the time value of the delay request message. Consequently, the delay request message may include two TTL values: (1) the TTL value of the delay response message (herein "delay response TTL value") and (2) the TTL value of the delay request message previously sent by slave device 6A to master device 4 (herein "delay request TTL value"). When slave device 6A receives such delay request messages that include both TTL values, slave device 6A may store the TTL values associated with the previously sent delay request messages in a data set for later use to determine a change in network topology.

Prior to network node 10A receiving the delay response message send by master device 4, a change in network topology may occur. For instance, network link 12H may fail. Consequently, network node 10B (e.g., a router), updates its forwarding information to re-route messages from network node 10B to network node 10C. When network node 10A forwards the delay response message to node 10B, node 10B subsequently forwards the message to node 10C. Network node 10C forwards the delay response message to node 10E, which in turn forwards the message to node 10D and then on to slave device 6A. Thus, due to the failure of network link 12H, the network path has changed from master device 4 to slave device 6A. Therefore, the TTL value of the delay response message is 250 when received by slave device 6A.

Slave device 6A receives the delay response message that includes the TTL value of the delay response message. Slave device 6A uses the differences in the time values of the sync message, delay request message, and delay response message to determine the network propagation delay of a synchronization message traveling from slave device 6A to master device 4 and from the master device to the slave device. Once slave device 6A has determined the network propagation delay, slave device 6A can compare the time value of the master clock of master device 4 and the internal clock of slave device 6A to determine whether the time values are synchronized.

In the example of FIG. 1, slave device 6A may determine, based on the time values of the sync message, delay request message, and delay response message, that the internal clock of slave device 6A is not synchronized with the master clock of master device 4. Consequently, slave device 6A determines a time adjustment value that, when applied to the internal clock of slave device 6A, synchronizes the time of the internal clock with the master clock of master device 4. In one example, the internal clock and the master clock may differ by 10 microseconds. Slave device, 6A may therefore initially determine a 10 microsecond time adjustment.

In accordance with techniques of the disclosure, slave device 6A further determines the time adjustment based at least in part on the delay response TTL value and TTL values of one or more previously received time synchronization messages (e.g., TTL values of sync messages that were previously stored in a data set as described above). In this way, slave device 6A can modify the time adjustment value in response to changes in network topology indicated by differing TTL values. For instance, slave device 6A, in response to receiving the delay response value, determines whether the delay response TTL value is different than TTL values of previously received time synchronization messages. In the example of FIG. 1, slave device 6A determines that the delay request TTL value of 252 is different from the previously received time synchronization messages.

Slave device 6A may determine, based on the differing TTL values that a change in network topology has occurred (e.g., network link 12H has failed), such that more hops were traversed by the delay response message than the previously received time synchronization messages. Consequently, slave device 6A can determine that the difference between the time that the delay response message was received by slave device 6A and the time that previously received time synchronization messages were sent, is larger because the number of hops from slave device 6A to master device 4 has increased. Slave device 6A may therefore determine that the time difference of 10 microseconds between the internal clock and the master clock is larger than the actual difference between the master and internal clocks due to the change in network topology. Rather than adjusting the internal clock by 10 microseconds, slave device 6A, in accordance with techniques of the disclosure, can reduce the time adjustment value to a value smaller than 10 microseconds, and apply the time adjustment value to the time of the internal clock.

Slave device 6A may, in some examples, also determine a change in network topology by determining that TTL values of two time synchronization messages that were previously sent from the slave device to the master device after different. For instance, as described above, master device 4 may also include the TTL value of the delay request message in the delay response message along with the time value of the delay request message. Consequently, the delay request message may include two TTL values: (1) the delay response TTL value and (2) the delay request TTL value. Slave device 6A can determine whether a network topology has change by comparing the delay request TTL value to previously determined TTL values of time synchronization messages that were previously sent by slave device 6A to master device 4, and stored in a data set by slave device 6A. If slave device 6A determines a difference between the delay request TTL value and previous TTL values and determines a change in network topology has occurred, slave device 6A may modify the time adjustment applied to the internal clock of slave device 6A.

By modifying the magnitude of the time adjustment value due to a change in network topology, in accordance with techniques of the disclosure, slave device 6A can improve the accuracy and precision of the internal clock of slave device 6A. Moreover, in some examples, administrators and automated agents may respond more quickly to non-optimal network conditions when a change in network topology using TTL values has been detected.

Figure 2:
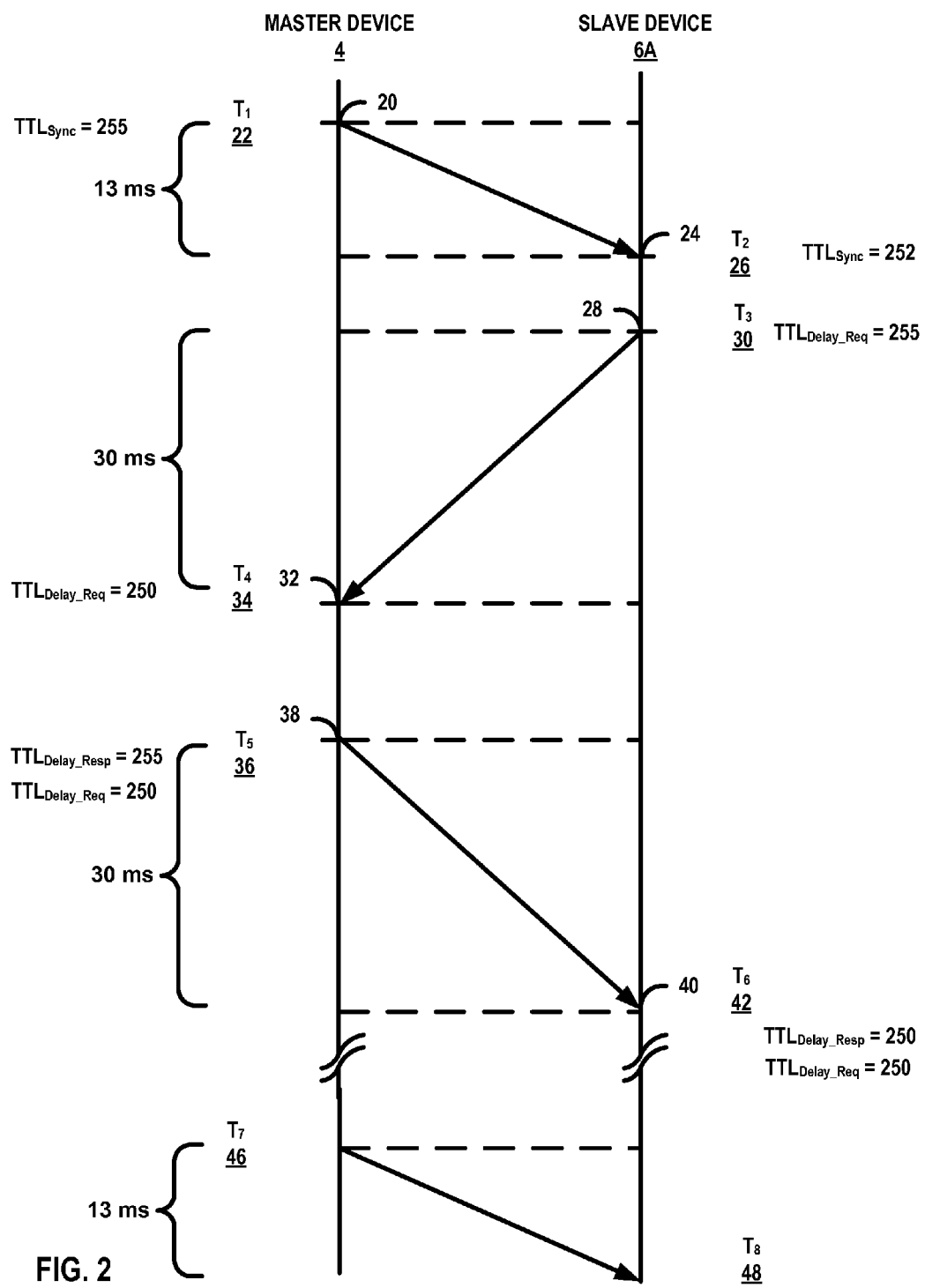
FIG. 2 is a timing diagram illustrating an example operation of time synchronization between a master device and a slave device, in accordance with the techniques described in this disclosure.

FIG. 2 is a timing diagram illustrating an example operation of time synchronization between a master device and a slave device, in accordance with the techniques described in this disclosure. As shown in the example of FIG. 2, slave device 6A may detect a change in the network path between slave device 6A and master device 4 by comparing a TTL value of a time synchronization message sent from master device 4 to slave device 6A to TTL values of time synchronization messages previously received by slave device 6A. While described with respect to master device 4 and slave device 6A as shown in FIG. 1, the example operation of FIG. 2 may be implemented by any network device capable of delivering time information. In the example of FIG. 2, master device 4 and slave device 6A each implement the Precision Time Protocol (PTP). The example of FIG. 2, illustrates master device 4 and slave device 6A using TTL values and PTP to improve the accuracy and/or precision of time synchronization. In FIG. 2, master device 4 serves as the authoritative source of time for slave device 6A.

In the example of FIG. 2, master device 4 initially sends a sync message to slave device 6A (20). The sync message includes a timestamp that is indicative of a time $T_1$ 22 when master device 4 sends the sync message. In some examples, the sync message includes a 48-bit field that is indicative of a time in seconds when master device 4 sent the sync message. The time may be formatted according to the International Atomic Time (TAI) timescale. The sync message may also include a 32-bit field that is indicative of the fractional portion of the time in nanoseconds when the message was sent by master device 4. The sync message further includes a TTL value. The TTL value of the sync message (e.g., $TTL_{Sync}$) when initially sent by master device 4 is set to 255. As the sync message traverses a network path through network 8, each network node decrements $TTL_{sync}$. In the example of FIG. 2, the sync message traverses three network hops in the network path from master device 4 to slave device 6A.

Slave device 6A receives the sync message and determines a timestamp that is indicative of a time $T_2$ 26 when slave device 6A received the sync message (24). In some examples, slave device 6A may store the timestamp of $T_2$ 26 for later use. In accordance with techniques of the disclosure, slave device 6A also determines that the value of $TTL_{Sync}$ is 252 because the sync message traversed three hops in the network route from master device 4 to slave device 6A.

Upon determining a timestamp for time $T_2$ 26, slave device 6A generates a delay request message that slave device 6A sends to master device 4. The delay request message includes an Internet Protocol header comprising an 8-bit field to store a TTL value of the delay request message (e.g., $TTL_{Delay\_Req}$). The value of $TTL_{Delay\_Req}$ is initially set to 255. As the delay request message traverses a network path through network 8 to master device 4, the TTL value is decremented at each network hop. In the example of FIG. 2, slave device 6A sends the delay request message to master device 4 at time $T_3$ (28).

In the current example, at some time occurring after $T_2$ 26 and prior to $T_3$ 30, a change in network topology of network 8 may occur. For instance a network link in the network path between slave device 6A and master device 4 may fail. Consequently, network nodes determine a new network path that includes more hops than the initial network path used by master device 4 to send the sync message to slave device 6A. The new network path may include five network hops rather than three network hops. As the delay response message traverses the new network path each hop decrements the value of $TTL_{Delay\_Resp}$. Thus, the value of $TTL_{Delay\_Resp}$ is decremented five times along the network path from master device 4 to slave device 6A.

Master device 4 subsequently receives the delay request message from slave device 6A (32). Upon receiving the delay request message, master device 4 determines a timestamp at time $T_4$ 32 when the delay request message was received by master device 4. In accordance with techniques of the disclosure, master device 4 further determines the TTL value ($TTL_{Delay\_Req}$) of the delay request message. In the example of FIG. 2, $TTL_{Delay\_Req}$ is 250 because the delay request message traversed five hops in the new network path from slave device 6A to master device 4. In some examples, master device 4 may store a timestamp for time $T_4$ 32 and/or the value of $TTL_{Delay\_Req}$ for later user.

Master device 4 subsequently, generates a delay response message that includes a timestamp for time $T_4$ 32. Moreover, in accordance with techniques of the disclosure, master device 4 includes the value of $TTL_{Delay\_Req}$ in the delay response message. Consequently, master device 4 generates a delay response message that includes (1) a timestamp for time $T_4$ 32 that is indicative of the time when the delay request message was received from slave device 6A, (2) a TTL value, $TTL_{Delay\_Resp}$ (e.g., delay response TTL value), of the delay response message, and (3) the TTL value, $TTL_{Delay\_Req}$ (e.g., delay request TTL value), of the delay request message.

In the example of FIG. 2, $TTL_{Delay\_Req}$ is initially set to a value of 255. By including $TTL_{Delay\_Req}$ in the delay response message, slave device 6A, upon later receiving the delay response message may compare $TTL_{sync}$ to $TTL_{Delay\_Resp}$ in order determine whether a change in network topology has occurred. As shown in FIG. 2, master device 4 sends the delay response message to slave device 6A at time $T_5$ 36.

Slave device 6A subsequently receives the delay response message from master device 4 (40). In the example of FIG. 2, slave device 6A determines a timestamp for time $T_6$ 42 when slave device 6A received the delay response message from master device 4. Once slave device 6A has received the delay response message, slave device 6A can determine the network propagation delay between slave device 6A and master device 4. The transit times of time synchronization messages from master device 4 to slave device 6A and from slave device 6A to master device 4 may be expressed, respectively, as shown in FIG. 2 as:

$$d_{MtoS} = T_2 - T_1 - o$$

$$d_{StoM} = T_4 - T_3 - o$$

where o is an offset that represents the network propagation delay between master device 4 and slave device 6A. As previously described, PTP assumes that a symmetric path exists between master device 4 and slave device 6A. Consequently, the two equations above may be combined to determine the offset o between master device 4 and slave device 6A:

$$o = \frac{(T_2 - T_1) - (T_4 - T_3)}{2}$$

Using the values illustrated in FIG. 2, slave device 6A may determine that the offset o between master device 6 and slave device 6A is:

$$o = 21.5 \text{ ms} = \frac{(13 \text{ ms}) - (-30 \text{ ms})}{2}$$

Using the equations above, slave device 6A may repeatedly determine the network propagation delay between slave device 6A and master device 4. Slave device 6A may then update its internal clock using the timestamps received in time synchronization messages from master device 4, and adjusting changes to the internal clock based on the network propagation delay. For example, slave device 6A may initially determine that the network propagation delay is approximately 13 milliseconds prior to the change in network topology. If the internal clock of slave device 6A is 5 microseconds delayed from the master clock of master device 4, slave device 6A, upon receiving a timestamp from master device 4, may increment the internal clock of slave device 6A five microseconds and further add thirteen milliseconds to the time of the internal clock to compensate for the network propagation delay of the timestamp from master device 4 to slave device 6A.

In the example of FIG. 2, the change in network topology may only be temporary. For instance, as shown in FIG. 2, at time $T_7$ 46 and $T_8$ 48, the network link failure that previously resulted in a greater number of hops between master device 4 and slave device 6A may be repaired after a short period of time. Thus, the network propagation delay may return to 13 milliseconds. Consequently, to avoid applying the larger offset due to the network failure to the internal clock of slave device 6A, slave device 6A may apply techniques of the disclosure to modify the magnitude of the time adjustment to the internal clock of slave device 6A in response to determining the change in network topology.

To determine time adjustments that correspond to changes in network topology, slave device 6A, in accordance with techniques of the disclosure, determines that the value of $TTL_{Delay\_Resp}$ included in the delay response message is 250 and that the value of $TTL_{Delay\_Req}$ is 250. Slave device 6A further determines that $TTL_{sync}$ is 252. In some examples, slave device 6A determines whether $TTLD_{Delay\_Resp}$ is different than at least one of $TTL_{sync}$ or $TTL_{Delay\_Req}$. In this way, slave device 6A can monitor whether TTL values of messages sent by master device 4 have changed. In the current example, slave device 6A determines that the value of 250 for $TTL_{Delay\_Resp}$ is different from the value of 252 for $TTL_{sync}$. Consequently, slave device 6A may determine that an asymmetric path exists between slave device 6A and master device 4 because the number of hops in the network path is different between master device 4 and slave device 6A.

In some examples, slave device 6A may continuously maintain timing data over a constant period of time. The timing data may include a set of times values that correspond to the times that master device 4 sends sync messages, the times that slave device 6A receives the sync messages, the times that slave device 6A sends delay request messages, and the times that master device 4 receives delay request messages. In some examples, slave device 6A receives time synchronization messages from master device 4 at a rate of 64 messages per second and stores all message over the course of a predetermined time (e.g., 60 second time interval). In such examples the timing data would include 3840 time samples of time synchronization messages. If slave device 6A determined, as in the example of FIG. 2, that a change in the network topology has occurred based on the TTL values, slave device 6A may flush or delete all stored data upon detecting the change in network topology. Slave device 6A would subsequently accumulate 60 additional seconds of timing data before making any further adjustments to the internal clock of slave device 6A.

In some examples, slave device 6A, upon determining a change in the network topology, slave device 6A determines an adjustment to the offset o that is applied to the internal clock of slave device 6A. For instance, slave device 6A may initially determine the offset o as described above. Furthermore, slave device 6A may determine that the network topology has changed based on the change in TTL values. In response to determining the change, slave device 6A can modify the offset o based on the change in network topology. For instance, rather than applying offset o to adjust the time of the internal clock, slave device 6A may apply an offset o' that is equal to:

$$o' = o + f(TTL_{sync} - TTL_{Delay\_Resp})$$

In the above equation, the offset o may be modified based on the function $f(TTL_{sync} - TTL_{Delay\_Resp})$ that corresponds to change in TTL values. The use of $TTL_{sync}$ and $TTL_{Delay\_Resp}$ are illustrative and any suitable TTL values may be used. In some examples, if the difference in TTL values that is indicative of an increase in the number of hops between master device 4 and slave device 6A, the function $f(TTL_{sync} - TTL_{Delay\_Resp})$ may generate a negative value that is applied to offset o. The negative value may be proportional to the increase in the number of hops such that offset o is reduced by a larger negative value if the number of hops has increased due to the network change. Conversely if the number of hops has decreased, the function $f(TTL_{sync} - TTL_{Delay\_Resp})$ may generate a positive value that is applied to offset o. In this way, slave device 6A can determine the adjustment in time to the internal clock of slave device 6A based at least in part on the change in the network topology.

Figure 3:
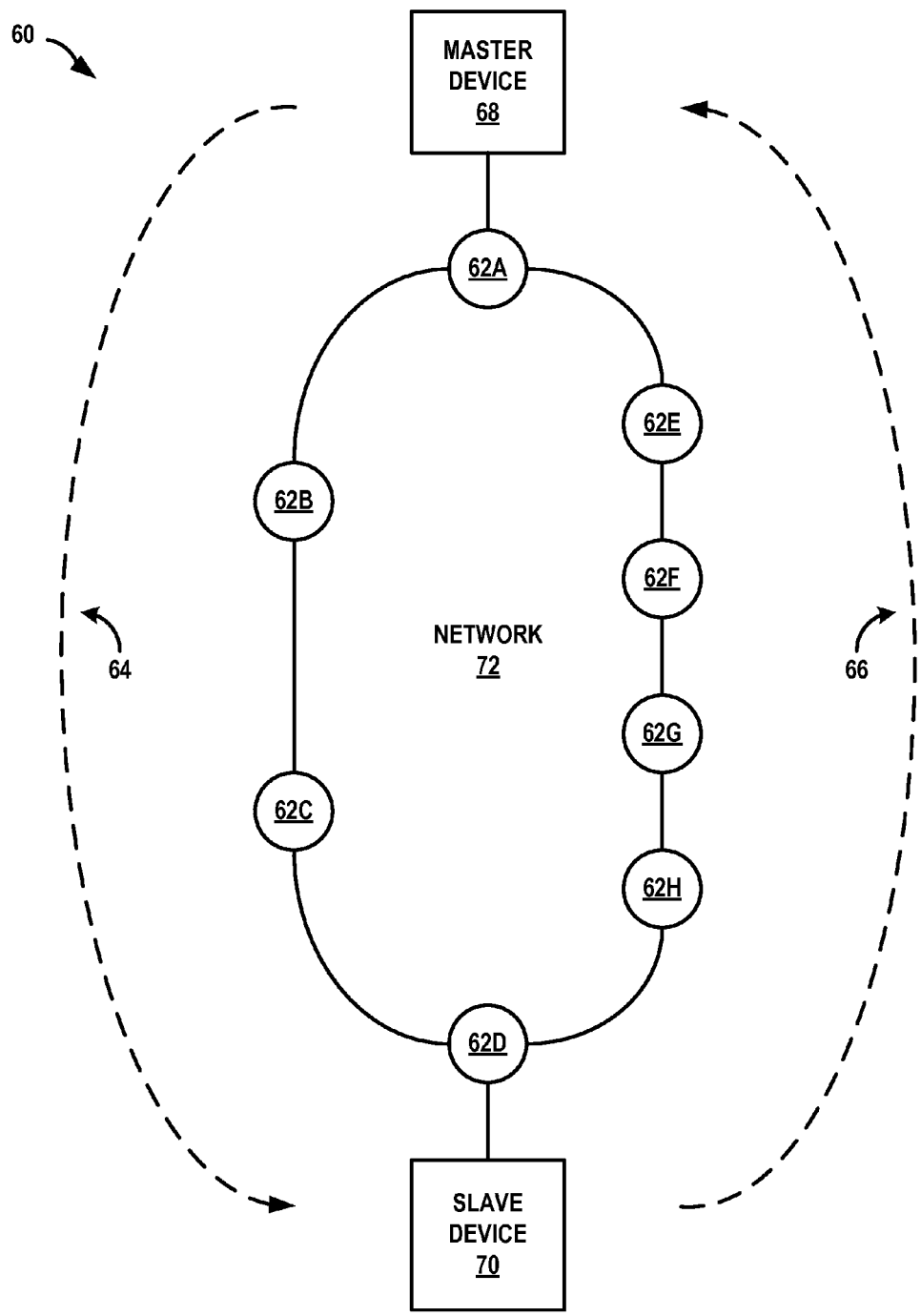
FIG. 3 is a block diagram illustrating an example network environment in which network nodes are synchronized to a primary reference clock, in accordance with techniques of the disclosure.

FIG. 3 is a block diagram illustrating an example network environment 60 in which network nodes are synchronized to a primary reference clock, in accordance with techniques of the disclosure. As described in the example of FIG. 3, slave device 70 determines the TTL values on time synchronization messages received from master device 68. By determining the TTL values on time synchronization messages received from master device 68, slave device 70 can determine a change in network topology. By determining changes to the network topology, slave device 70 can notify an administrator or automated agent of changes in the network topology. Slave device 70, in the example of FIG. 3, can determine such changes without knowing the original TTL value applied by master device 68 to time synchronization messages sent to slave device 70. Consequently, in some examples of FIG. 3, no modifications of master device 68 are required to enable slave device 70 to determine a change in network topology.

As shown in FIG. 3, slave device 70 synchronizes its internal clock with master device 68 using network 72. Network 72 includes network nodes 62A-62H. Master device 68, slave device 70 and network nodes 62A-62H are operatively coupled by one or more network links. Initially, slave device 60 determines that master device 68 is the authoritative and/or optimal time source in network 72. Consequently, slave device 70 will begin receiving time synchronization messages from master device 68 as described in FIGS. 1 and 2.

Upon receiving a sync message from master device 68, slave device 70 determines the TTL value of the message. In the example of FIG. 3, each time synchronization message sent by master device 68 to slave device 70 includes a single TTL value that represents a number of hops traversed by the time synchronization message in network 72 from master device 68 to slave device 70. Initially, time synchronization messages sent by master device 68 to slave device 70 traverse network nodes 62A, 62B, 62C, and 62D. Consequently, if the initial TTL value of a time synchronization message sent by master device 68 is 255, the TTL values of the messages when received by slave device 70 will be 251.

Slave device 70, in some examples, stores the TTL values of time synchronization messages as timing data. The timing data may be stored in any suitable data structure, such as a database, map, array, etc. As slave device 70 subsequently receives time synchronization messages from master device 68, slave device 70 may store and update TTL values of the messages. In the current example of FIG. 3, slave device 70, in response to receiving the sync message from master device 68, sends a delay request message to master device 68. The initial TTL value of the delay request message is 355. The delay request message traverses network nodes 62D, 62C, 62B, and 62A before reaching master device 68. Consequently, the TTL value of the delay request message is 251.

Prior to master device 68 sending a delay response message back to slave device 70, a network link failure may occur between network nodes 62B and 62C. Consequently, master device 68 and slave device 70 update forwarding information in their respective devices, such that time synchronization messages are re-routed by the devices using a network path 66 that includes network nodes 62A, 62E, 62F, 62G, 62H and 62D. In the example of FIG. 3, when master device 68 receives the delay request message, master device 68 generate a delay response message that does not include the TTL value of the delay request message as described in FIGS. 1 and 2. Instead, master device 68 generates a delay response message that includes a single TTL value of 255 that corresponds to the delay request message.

Master device 68 then sends the delay response message to slave device 70 using the network path that includes network nodes 62A, 62E, 62F, 62G, 62H, and 62D. Slave device 70, upon receiving the delay response message determines the TTL value of the message. Because the delay response message has traversed six network nodes from master device 68 to slave device 70, slave device 70 determines that the TTL value of the message is 249.

Slave device 70, in the example of FIG. 3, determines that the TTL value of 249 is different than the TTL values of 251 that were associated with previously received time synchronization messages. Consequently, slave device 70 can determine based on the change in TTL values that a change has occurred in the network topology of network 72. In the example of FIG. 3, slave device 70 can determine that a change in network topology of network 72 has occurred without knowing the originating TTL value of time synchronization messages sent by master device 68 to slave device 70. Thus, because slave device 70 is determining changes in TTL values of messages received from master device 68, slave device 70 need not know the originating, initial TTL value of such messages to determine that a change in network topology has occurred.

In response to determining that a change in TTL values has occurred, and therefore a change in the network topology of network 72 has occurred, slave device 70 can determine one or more operations. For instance, slave device 70, in some examples can send a notification message to an administrator or automated agent to indicate that a change in network topology has occurred. Slave device 70 may send a notification message if slave device 70 determines the asymmetric path is permanent. In this way, the administrator and/or agent can determine if a problem has occurred in network 72 (e.g., failure of a network link) and take corrective action to remedy the problem. In some examples, slave device 6A sends the notification message to the administrator or automated agent when the change in TTL values exceeds a predefined threshold value. For instance, the predefined threshold value may be equal to a number of additional hops that a time synchronization message must traverse due to a change in network topology. In another example, the predefined threshold value may be a quantity of messages having a TTL value that differs from previously determined TTL values.

In another example, slave device 70, as described in FIGS. 1 and 2, can modify the magnitude of the time adjustment applied to the internal clock of slave device 70 when slave device 70 determines that a change in network topology has occurred. For instance, slave device 70, in some examples, may determine that a TTL value of a message received from master device 68 is smaller than previously received TTL values. Consequently, slave device 70 may determine that a change in network topology has resulted in an increased number of hops between master device 68 and slave device 70. Slave device 70 may therefore determine that the time synchronization message sent by master device 68 with the changed TTL value required more time than previously received message to reach slave device 70. Slave device 70, in response to determining this change, may reduce the magnitude of the time adjustment to the internal clock because of the increased time delay resulting from the increased number of hops. In this way, slave device 70 may apply a smaller time adjustment to the internal clock in response to detecting the change in network topology thereby improving the accuracy and/or precision of the internal clock.

In another example, slave device 70, in some examples, may determine that a TTL value of a message received from master device 68 is larger than previously received TTL values. Consequently, slave device 70 may determine that a change in network topology has resulted in a decreased number of hops between master device 68 and slave device 70. Slave device 70 may therefore determine that the time synchronization message sent by master device 68 with the changed TTL value required less time than previously received message to reach slave device 70. Slave device 70, in response to determining this change, may increase the magnitude of the time adjustment to the internal clock because of the decreased time delay resulting from the decreased number of hops. In this way, slave device 70 may apply a larger time adjustment to the internal clock in response to detecting the change in network topology thereby improving the accuracy and/or precision of the internal clock. In some examples, slave device 70 may not immediately change the magnitude of the time adjustment in response to determining the change in network topology. For instance, slave device 70 may determine whether a data set of previously determined TTL values has a quantity of TTL values that is greater than a predetermined threshold value. The predetermined value may be a default value set by slave device 70 or a value received from a user. In this way, slave device 70 may refrain from adjusting the time of the internal clock until slave device 70 has a data set with a sufficient quantity of TTL values.

Figure 4:
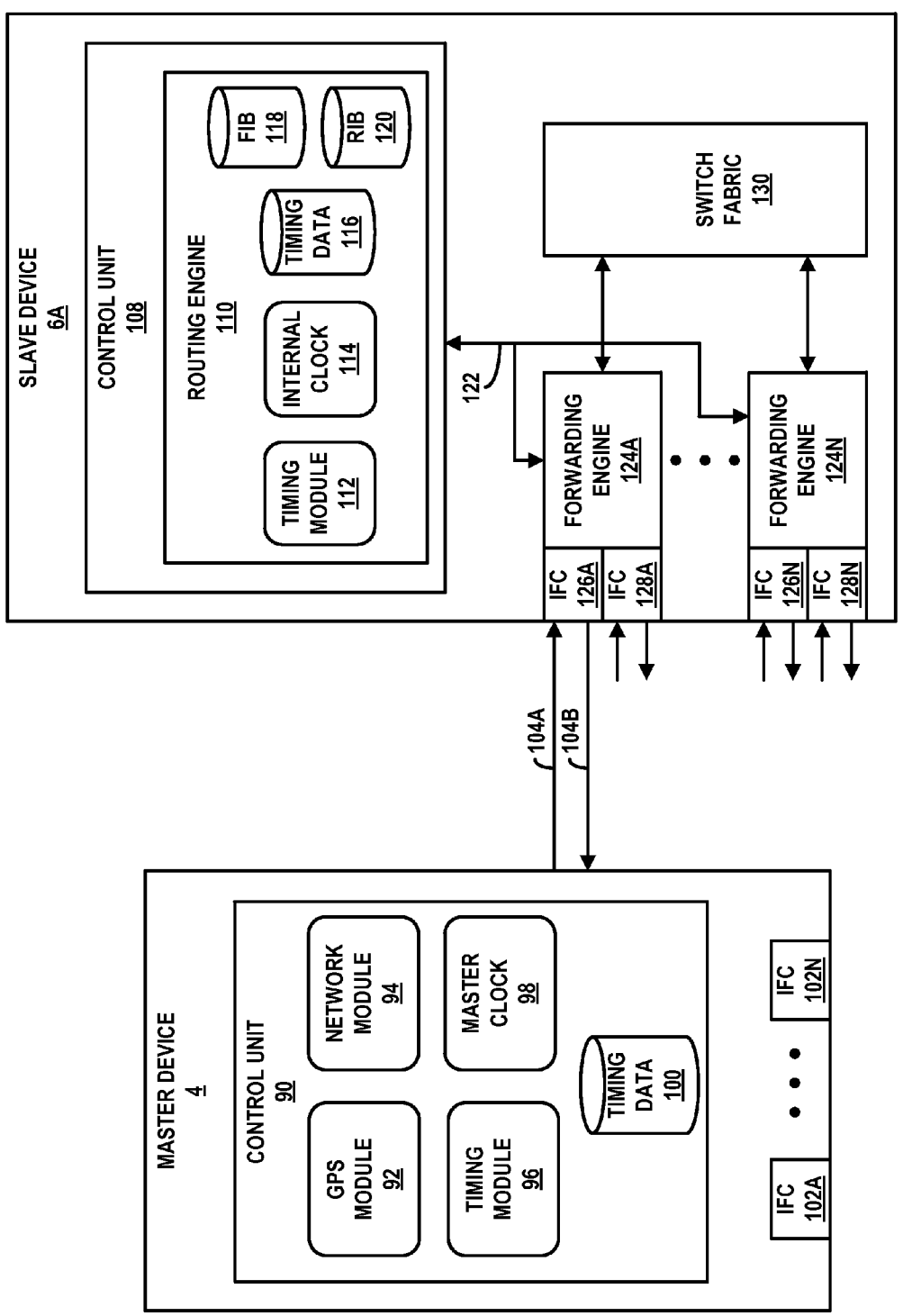
FIG. 4 is a block diagram illustrating an example embodiment of a master device and a slave device in accordance with techniques of the disclosure.

FIG. 4 is a block diagram illustrating an example embodiment of a master device and a slave device in accordance with techniques of the disclosure. As shown in FIG. 4, client device 6A includes a control unit 108, forwarding engines 124A-124N, and switch fabric 130. Forwarding engines 124A are also operatively and/or communicatively coupled to network interfaces 126A-126N and 128A-128N. Control unit 108 includes routing engine 110, which further includes timing module 112, internal clock 114, timing data 116, forwarding information base 118, and routing information base 120.

Master device 4, in some examples, includes a control unit 90 and network interfaces 102A-102N. Control unit 90 further includes a Global Positioning System (GPS) module 92, network module 94, timing module 96, master clock 98, and timing data 100. Master device 4 may be operatively and/or communicatively coupled to client device 6A by one or more network links 104A-104B. As described in FIG. 1, master device 4 may be any type of device capable of operating within network system. For example, master device 4 may be a network device, such as a network hub, network switch, network router, or the like. In some examples, master device 4 may be a computing device, such as a personal computer, laptop computer, handheld computer, workstation, server, switch, or the like Control unit 90 of master device 4 may comprise one or more processors that execute software instructions stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 90 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 90 provides an operating environment for master device 4 and may be implemented solely in software, or hardware, or may be implemented as a combination of software, hardware or firmware. For example, control unit 90 may include one or more processors which execute software instructions.

GPS module 92, in some examples, communicates with one or more GPS devices (e.g., GPS device 3 of FIG. 1) that include primary reference clocks that serve as authoritative sources of time for master clock 98 of master device 4. In some examples, GPS module 92 locates multiple GPS devices and determines the distance to each identified GPS device using trilateration or other such suitable techniques. Upon determining the GPS devices, GPS module 92 receives time signals from the GPS devices. GPS module 92 converts the time signals to time values using one or more time protocols, such Coordinated Universal Time (UTC), International Atomic Time (TAI), etc.

Master clock 98 receives the time values generated by GPS communication module. In response to receiving the time values, master clock 98 sets the time of master clock 98 according to the time values. For instance, master clock 98 may update its time to the time values received from GPS module 92. In some examples master clock 98 is a hardware clock with an oscillator. The oscillator may be comprised of any suitable material, such as quartz, cesium, etc. Master clock 98 divides the frequency of the oscillator and generates a clock signal at a predetermined frequency. The time of master clock 98 is incremented in response to determining the clock signals and may further be updated in response to receiving time values from GPS module 92. As described in the examples of the disclosure, the time of master clock 98 may be the authoritative source of time for internal clocks of the slave devices.

Control unit 90 also includes a network module 94. Network module 94, in some examples, includes logic to communicate information between interfaces 102A-10N and modules included in control unit 90. Network interfaces 102A-102N, as shown in FIG. 4, are network interfaces capable of sending and receiving information such as time synchronization messages using network links 104A-104B. Network interfaces 102A-102N, in some examples, include physical ports to which network links 104A-104B are coupled. In other examples, network interfaces 102A-102N include hardware and/or a combination of hardware and software to wirelessly communicate with other computing devices such as slave device 6A.

Control unit 90 also includes timing module 96. Timing module 96 can determine the time of master clock 98. In some examples, timing module 96 can also periodically set the time of master clock 98 based on time values received from GPS module 92. Timing module 96 may perform techniques of the present disclosure to improve the accuracy and/or precision of time synchronization internal clock 114 of slave device 6A. In some examples, timing module 96 implements one or more time synchronization protocols, such as Precision Time Protocol (PTP), Network Time Protocol (NTP), etc. In this way, master device 4 and slave device 6A can exchange time synchronization messages. Moreover, master device 4 may use one or more such protocols to determine the time of master clock 98. As will be further described below in the example of FIG. 4, timing module 96 can generate, for example, a delay response message that include includes (1) the TTL value of a delay response message and (2) a TTL value of a delay request message previously sent by slave device 6A to master device 4. In this way, master device 4, implementing techniques of the present disclosure, can provide slave device 6A with TTL values that are usable by the slave device to determine whether a change in the network path between the master and slave devices has occurred.

Referring now to slave device 6A, as previously described, slave device 6A may be a network device, such as a network hub, network switch, network router, or the like. In some examples, slave device 6A may be a computing device, such as a personal computer, laptop computer, handheld computer, workstation, server, switch, printer, and the like. As shown in FIG. 4, slave device 6A may be a network router. Slave device 6A includes a control unit 108, routing engine 110, forwarding engines 124A-124N, and switch fabric 130. Routing engine 110 includes a timing module 112, internal clock 114, timing data 116, forwarding information base 118, and routing information base 120. Forwarding engines 124A-124N are associated with network interfaces 126A-126N and 128A-128N. In some examples, control unit 108 and packet forwarding engines (PFEs) 124A-124N are coupled by a dedicated link 122.

Control unit 108 of slave device 6A may comprise one or more processors that execute software instructions stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 108 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 108 provides an operating environment for routing engine 110 and may be implemented solely in software, or hardware, or may be implemented as a combination of software, hardware or firmware. For example, control unit 108 may include one or more processors which execute software instructions.

In this example, control unit 108 includes a routing engine 110 that provides control plane functionality for slave device 6A. Slave device 6A also includes a plurality of packet-forwarding engines 124A-124N and a switch fabric 130 that collectively provide a data plane for forwarding network traffic. PFEs 124 receive and send data packets via network interfaces 126A-126N and network interfaces 128A-128N. In other embodiments, each of PFEs 124 may comprise more or fewer IFCs. Although not shown, PFEs 124 may each comprise a central processing unit (CPU) and a memory. Switch fabric 130 provides a high-speed interconnect for forwarding incoming data packets to the correct one of PFEs 124 for transmission over a network. In some examples, multiple PFEs may be hosted on a line card, which have one or more processors and memory. The one or more processors and memory may maintain a pool of PFEs, each PFE comprising one or more application-specific integrated circuits (ASICs).

Routing engine 110 provides control plane functions for storing network topology in the form of routing tables or other structures, executing routing protocols to communicate with peer routing devices and maintain and update the routing tables, and providing a management interface to allow user access and configuration of slave device 6A. In that case, routing engine 110 may include various software modules or daemons (e.g., one or more routing protocol processes, user interfaces and the like), and control unit 108 may computer-readable storage medium, such as computer memory or hard disk, for storing executable instructions.

Routing engine 110 is connected to each of PFEs 124 by a dedicated internal communication link 122. For example, dedicated link 122 may comprise a 200 Mbps Ethernet connection. Routing engine 110 maintains routing information that describes a topology of a network, and derives a routing information base (RIB) 120 in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). Forwarding information base 118 is generated based on selection of certain routes within the network and maps packet key information (e.g., destination information and other select information from a packet header) to one or more specific next hops and ultimately to one or more specific output interface ports of network interfaces 126A-126N and 128A-128N. Routing engine 110 communicates data representative of a software copy of FIB 118 into each of PFEs 124 to control forwarding of traffic within the data plane. In some instances, routing engine 110 may derive separate and different software FIBs for each respective PFEs 124.

As shown in FIG. 4, routing engine 110 also includes an internal clock 114. In some examples, slave device 6A synchronizes the time of internal clock 114 with master clock 98 using one or more time synchronization protocols such as PTP. In some examples internal clock 114 is a hardware clock with an oscillator. The oscillator may be comprised of any suitable material, such as quartz, cesium, etc. In some examples, similar to master clock 90, internal clock 114, divides the frequency of the oscillator and generates a clock signal at a predetermined frequency. The time of internal clock 114 is incremented in response to determining the clock signals and may further be updated in response to receiving time synchronization messages from master device 4. In some examples, the oscillator may oscillate at 10 megahertz. Other example oscillators may oscillate at an example frequency between 1 megahertz and 80,000 megahertz. The example frequencies are intended as examples and other suitable clock frequencies are also possible.

Routing engine 110 also includes a timing module 112. Timing module 112 may implement techniques of the present disclosure to improve the accuracy and/or precision of time synchronization between internal clock 114 and master clock 98. Although timing module 112 is illustrated in routing engine 110 of FIG. 4, in some examples, timing module 112 may be implemented in one or more Field-Programmable Gate Array (FPGA) of PFEs 124. In such examples, timing module 112 configures FIB 114 in accordance with techniques of the disclosure. Routing engine 110 may configure forwarding engines 124A-124N based on the contents of FIG. 118. In other examples, timing module 112 may be implemented in a Service Physical Interface Card (S-PIC). The S-PIC that includes timing module 112 in such examples may be attached to a chassis of slave device 6A and operatively coupled to one or more forwarding engines 124 and/or routing engine 110.

In some examples, timing module 112 may implement one or more time synchronization protocols to synchronize internal clock 114 with master clock 98 of master device 4. Examples of such time synchronization protocols may include Precision Time Protocol, Network Time Protocol, etc. The time of internal clock 114 may become unsynchronized with master clock 98 of master device 4 due to temperature, age of the internal clocks, frequency rate of the clock, etc. To synchronize internal clock 114 with master clock 98, slave device 6A can communicate with master device 4 using the time synchronization protocols.

In the example of FIG. 4, the PTP standard protocol may be extended to implement techniques of the present disclosure. Specifically, as further described below, timing module 96 of master device 4 may perform techniques to receive time synchronization messages from slave device 6A, determine the TTL value of the received time synchronization messages, and send subsequently time synchronization messages back to slave device 6A that include the previously determined TTL values of the time synchronization messages received from slave device 6A. In some examples, headers of time synchronization messages sent by master device 4 to slave device 6A may include an additional field to store the TTL value of the time synchronization message previously received from slave device 6A. Furthermore, in some examples, slave device 6A and master device 4 may negotiate an initial TTL that will be used by one or both devices. By establishing agreement between the devices of the initial TTL value, slave device 6A can determine what TTL values to expect from master device 4 and also whether a change in network topology has occurred. These techniques are now described below with respect to FIG. 4.

To begin time synchronization in accordance with techniques of the present disclosure, slave device 6A initially determines an authoritative source of time using the PTP protocol. In the example of FIG. 4, slave device 6A determines that master device 4 is the authoritative source of time for slave device 6A. In accordance with techniques of the disclosure, timing module 112 may send an initial control message to master device 4 to determine whether master device 4 supports techniques to generate a time synchronization message that includes (1) a first TTL value of the time synchronization message and (2) a second TTL value of a time synchronization message that was previously received from slave device 6A. Master device 4, upon receiving the control message, can send an acknowledgement message back to slave device 6A that indicates whether such techniques are supported. Timing module 112, upon receiving the acknowledgement message, sends a subsequent control message back to master device 4. The subsequent control message in some examples indicates the rate at which time synchronization messages are sent by master device 4 to slave device 6A. In some examples, the subsequent control message can include a specified starting TTL value for time synchronization message. For example, the subsequent control message may specify that the starting TTL value for time synchronization messages sent by master device 4 and slave device 6A is 190. The subsequent control message, in some examples, also includes information to request that master device 4 include the TTL value of time synchronization messages received from slave device 6A in subsequent time synchronization messages sent from master device 4 to slave device 6A. Once timing module 112 has generated the subsequent control message, timing module 112 sends the control message to master device 4.

In the current example, timing module 96 of master device 4, in response to receiving the subsequent control message, determines that the message indicates a request to send 64 time synchronization messages per second. Timing module 96 can operate in accordance with the subsequent control message to send sync messages at the specified rate. Timing module 96 can further operate in accordance with the subsequent control message to use a TTL value of 190 as the starting TTL value for time synchronization messages. Additionally, timing module 96 can operate in accordance with the subsequent control message to include the TTL value of time synchronization messages received from slave device 6A in subsequent time synchronization messages sent from master device 4 to slave device 6A.

Timing module 96, upon receiving the subsequent control message, begins sending sync messages to slave device 6A with starting TTL values of 190. Timing module 112 upon receiving a sync message, determines the TTL value of the message, e.g., 178 (indicating 12 hops were traversed in the network path from master device 4 to slave device 6A). In some examples, the TTL value is stored in timing data 116. Timing module 112 further determines a time value of the sync message that indicative of the time at which slave device 6A received the sync message. In some examples, timing module 112 stores the time value in timing data 116. Timing module 112 also determines a time value that is indicative of the time included in the sync message when master device 4 sent the sync message to slave device 6A. In some examples, timing module 112, stores the time value in timing data 116.

Timing data 116 may generally comprises a data set of time values and/or TTL values. Timing data 116 can include time values and TTL values of any time synchronization messages determined by timing module 112. Timing module 112 can subsequently use timing data 116 to determine the network propagation delay from master device 4 to slave device 6A as described in the present disclosure (e.g., in FIG. 2). Moreover, timing module 112, as further described below, can use and/or modify timing data 116 in response to receiving TTL values in order to modify time adjustments to internal clock 114.

In the current example, timing module 112, in response to receiving the sync message from master device 4, sends a delay request message back to master device 4. The delay request message includes an initial TTL value of 190. Prior to sending the delay request message, however, a change in network topology may have occurred resulting in a network path that includes 15 network hops.

Timing module 96 of master device 4, in some examples, may initially determine a time value that is indicative of the time when the master device 4 received the delay request message. Timing module 96 may also determines the TTL value of the delay request message. Because the network path includes 15 hops, timing module 96 may determine that the TTL value of the delay request message is 175. In some examples, timing module 96 may store the TTL value of the delay request message and the time value when master device 4 received the delay request message in timing data 100.

Timing module 96 subsequently generates a delay response message. The delay response message includes (1) a time value that is indicative of the time when the delay request message was received by master device 4 from slave device 6A, (2) a TTL value of the delay response message (e.g., 190), and (3) a TTL value of the delay request message (e.g., 175). Timing module 96 subsequently sends the delay response message to slave device 6A. The delay request messages traverses the 15 network nodes of the network back to slave device 6A.

Slave device 6A receives the delay response message. Upon receiving the message, timing module 112 determines the time value included in the delay response message that is indicative of the time when master device 4 received the delay request message from slave device 6A. Timing module 112 may store each of the time values in timing data 116. Using the techniques described in FIGS. 1 and 2, timing module 112 determines whether, taking into account the network propagation delay, the time of internal clock 114 is different than the time of master clock 98. In the current example, the time of internal clock 114 is behind the time of master clock 98. Therefore, timing module 112 determines the difference between the times as the initial time adjustment.

In accordance with techniques of the disclosure, timing module 112 determines whether the initial time adjustment and/or timing data 116 may be modified in view a change in network topology by determining the TTL values of the delay request and delay response messages. For instance, timing module 112 determines the TTL value of the delay response message ("delay response TTL value"). Timing module 112 further determines the TTL value of the delay request message ("delay request TTL value") that is included in the delay response message. In some examples, timing module 112 stores each of the time values in timing data 116. Timing module 112 can then determine whether the delay response TTL value is different than TTL values of time synchronization messages that slave device 6A previously received from master device 4.

As previously described above, timing module 112 stores timing data 116, which can include a set of time values that are indicative of when time synchronization messages are sent and received by slave device 6A. In the current example, timing module 112 divides time values into 10 second groupings or "buckets," such that time values of time synchronization message received in the first 10 seconds of a 60 second interval are stored in the first bucket, the second 10 seconds of the 60 second internal are stored in a second bucket, etc. Timing module 112 generates 6 buckets and time values for the time synchronization messages are stored accordingly in each of the buckets as the messages are received. Over time, timing module 112 generates a data set that timing module 112 can use to adjust the time of internal clock 114.

In the current example, timing module 112 can determine the average network propagation delay for each bucket based on the timing values included in each bucket. Timing module 112 then determines the overall average propagation delay by further averaging the average network propagation day value of each bucket. Timing module 112 may determine the overall average propagation delay when timing module 112 determines that no changes in TTL values have occurred.

In some examples, however, timing module 112 may determine that, for example, the TTL value of a delay request message is different from one or more previously received sync messages. In such examples, timing module 112 may apply a weighting factor to the average time value of the bucket corresponding to the time when the TTL value changed. For instance, if timing module 112 determined a change in TTL values at the 25th second of a 60 second interval, the corresponding bucket is the third bucket of the six buckets. Consequently, timing module 112 can apply a weighting value to reduce the weight of average time value for the third bucket in the overall average time value representing the network propagation delay. For example, timing module 112 can apply a weighting value to the average time value of the third bucket such that the time value is given half the weight of the other buckets. In some examples, the weighting factor is applied to the average time value of the third bucket for a predetermined period of time. In this way, timing module 112 applies more weight to the data gathered before the change in network topology until after enough time has passed to begin trusting the newer path data. In this way, timing module 112 may enable the slave to more rapidly react to the change in network topology but incrementally trust newer path data that indicates the differing TTL values.

In other examples, rather than applying a weight to the average value of a bucket when timing module 112 determines a change in TTL values, timing module 112 can disregard timing values of a time synchronization message that includes a TTL value that differing from the overall average value and/or the average time value of a bucket. For instance, if timing module 112 determines that a time synchronization message received at the $25^{th}$ second of a 60 second interval has a TTL value that differs from either and/or both of the overall average time value or the average time value of the third bucket, timing module 112 can disregard the time values of the time synchronization message. In this way, anomalous time values due to temporary changes in network topology may be disregarded by timing module 112.

In other examples, timing module 112 stores timing data 116, which can include a set of time values that are indicative of when time synchronization messages are sent and received by slave device 6A. Timing module 112, as described above, may determine that the TTL value of a received time synchronization message differs from a TTL value of a previously determined time synchronization message. Timing module 112 may determine a difference between the TTL value of the received message and the one or more TTL values of previously received messages. In some examples, timing module 112 can determine a confidence value based on the difference between the TTL values. For example, timing module 112 may apply a lower confidence value to timing values of a message with a TTL value that differs from previously determined TTL values by a large difference. Timing module 112 may apply a higher confidence value to timing values of a message with a TTL value that differs from previously determined TTL values by a small difference. In some examples, the confidence value is proportional to the difference between the TTL value of the message and one or more previously determined TTL values. Timing module 112, may in some examples, disregard time values of a time synchronization message when the confidence value associated with the time values is less than a predetermined value. In other examples, timing module 112 may apply a weight proportional to the confidence value to the time value of such a time synchronization message.

Figure 5:
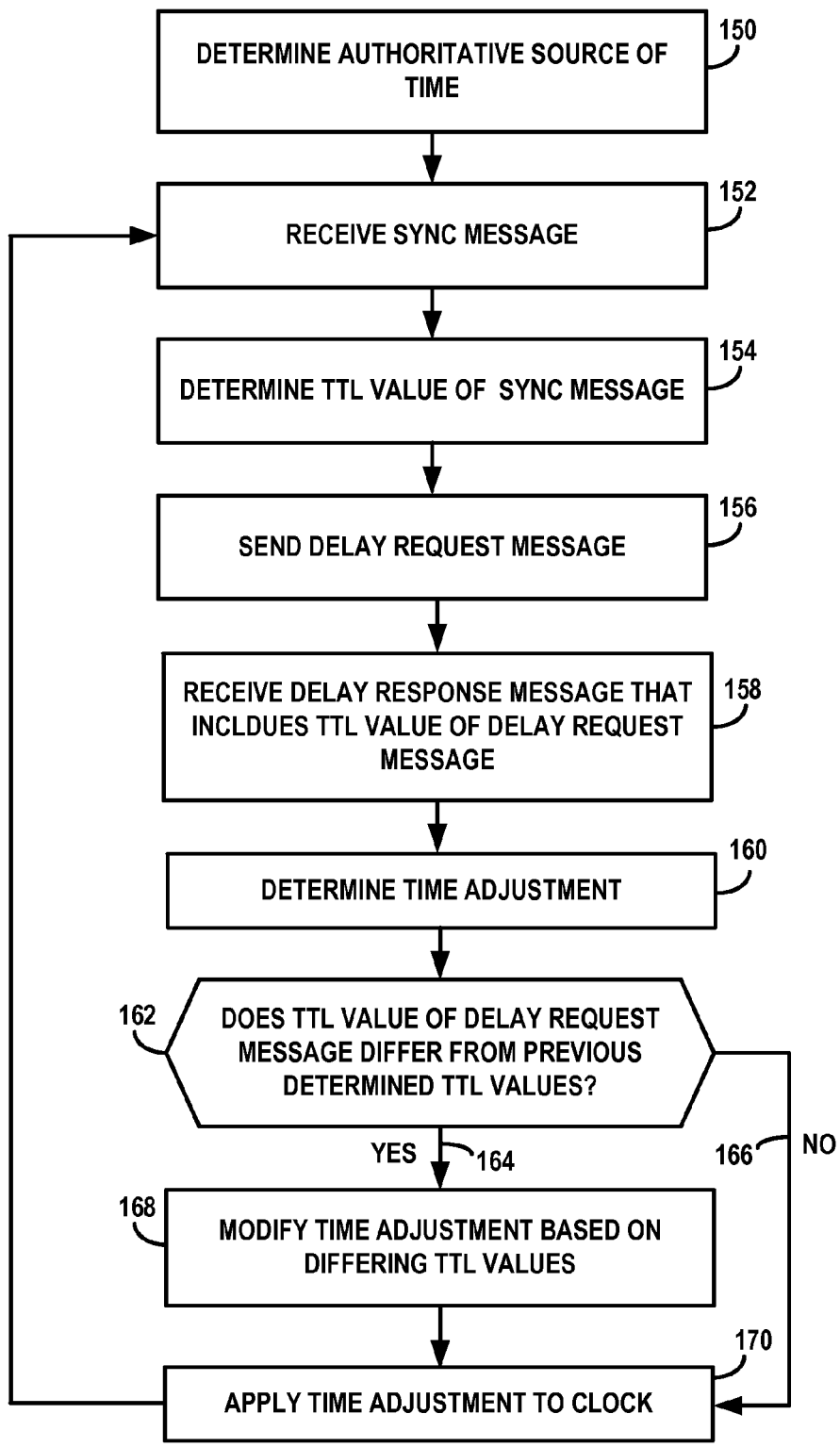
FIG. 5 is a flowchart that illustrates example operations of slave device, such as slave device of the example of FIG. 1, that implement techniques of the present disclosure.

FIG. 5 is a flowchart that illustrates example operations of slave device, such as slave device 6A of the example of FIG. 1, that implement techniques of the present disclosure. While described with respect to slave device 6A in FIG. 1, the techniques may be implemented by any type of network device capable of performing one or more functions of slave device 6A described in the disclosure.

In the example of FIG. 5, slave device 6A initially determines an authoritative source of time using a time protocol, such as Precision Time Protocol (150). Upon determining that master device 4 is the authoritative source of time, slave device 6A begins receiving sync messages from master device 4 (152). In response to receiving a sync message from master device 4, slave device 6A determines the TTL value of the sync message (154). In some examples, slave device 6A further determines a time value included in the sync message that is indicative of when master device 4 sent the sync message to slave device 6A. Slave device 6A may also determine the time at which it received the sync message from master device 4.

Slave device 6A then sends a delay request message to master device 4 (156). When slave device 6A sends the delay request message, slave device 6A may determine the time at which the delay request message was sent. As described in other examples of the disclosure, master device 4 receives the delay request messages and generates a delay response message. The delay response message may include the TTL value of the delay response message, the TTL value of the delay request message sent by slave device 6A, and the time when slave master device 4 received the delay response message from slave device 6A. Master device 4 sends the delay response message to slave device 6A.

Slave device 6A then receives the delay response message from master device 4 (158). Upon receiving the delay response message, slave device 6A determines the time included in the delay response message that is indicative of when the delay request message was received by master device 4 from slave device 6A. Using this time, slave device 6A determines a time adjustment to its internal clock (160). Slave device 6A may also determine whether the TTL value of the delay request message is different than TTL values of the delay response message and/or the sync message (162). If the delay request TTL value is different than either of the TTL values of the delay response message and/or the sync message (164), slave device 6A modifies the time adjustment based on the differing TTL values (168). For instance, if the number of hops increased due to a change in the network topology, slave device 6A may reduce the magnitude of the time adjustment.

If the delay request TTL value is not different than either of the TTL values of the delay response message and the sync message (166), slave device 6A may apply the time adjustment without modification to the internal clock of slave device 6A (170). If, however, the delay request TTL value is different than either of the TTL values of the delay response message and/or the sync message, the modified time adjustment is applied to the internal clock of slave device 6A.

Figure 6:
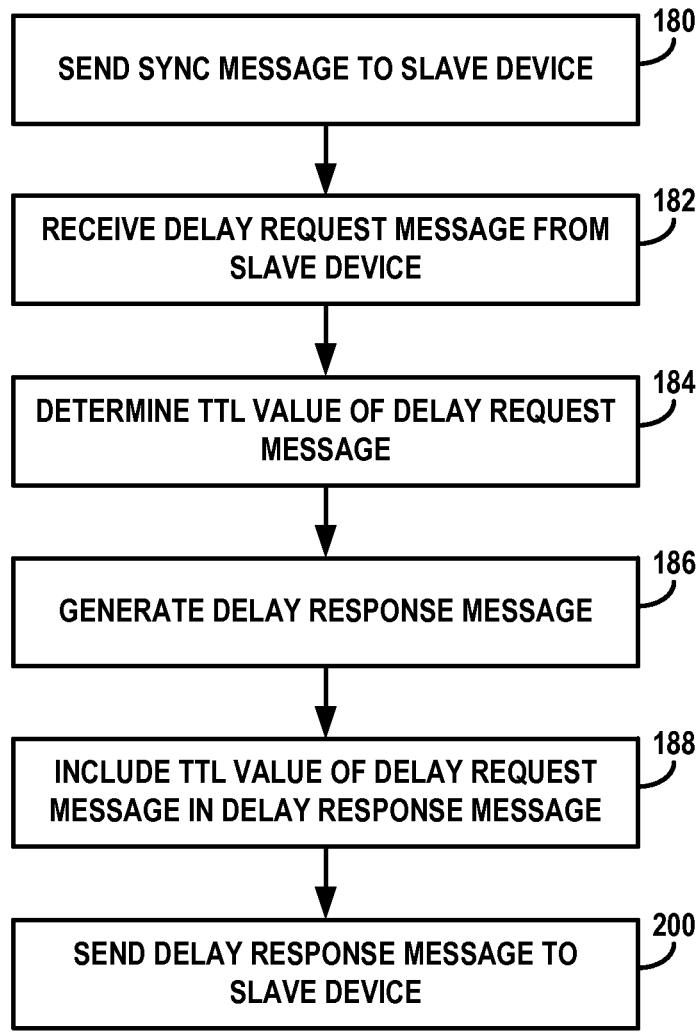
FIG. 6 is a flowchart that illustrates example operations of master device, such as master device 4 of the example of FIG. 1, that implement techniques of the present disclosure.

FIG. 6 is a flowchart that illustrates example operations of master device, such as master device 4 of the example of FIG. 1, that implement techniques of the present disclosure. While described with respect to master device 4 in FIG. 1, the techniques may be implemented by any type of network device capable of performing one or more functions of master device 4 described in the disclosure.

Initially, master device 4 sends a sync message to slave device 6A using the PTP protocol (180). The sync message can include a time value that is indicative of the time when master device 4 sent the sync message to slave device 6A. Slave device 6A, in response to receiving the sync message, sends a delay request message to master device 4. Master device 4 subsequently receives the delay request message from slave device 6A (182). Upon receiving the delay request message, master device 4 determines the TTL value of the delay request message (184). Master device 4 subsequently generates a delay response message that includes a time value indicating the time when master device 4 received the delay request message from slave device 6A. In accordance with techniques of the disclosure master device 4 also includes the TTL value of the delay request message (188). A second TTL value associated with the delay response message is also included in the delay response message. Master device 4 may then send the delay response message to slave device 6A (200). Slave device 6A, using techniques of the disclosure, may determine whether a change in network topology has occurred based on the TTL values included in the delay response message.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
receiving, by a slave device, a first time synchronization message from a master device that comprises a first TTL value, wherein the first TTL value is indicative of a number of hops traversed by the first time synchronization message from the master device to the slave device;
subsequently receiving, by the slave device, a second time synchronization message from the master device that comprises a second TTL value, wherein the second TTL value is indicative of a number of hops traversed by the second time synchronization message from the master device to the slave device;
in response to determining that at least the second TTL value is different than the first TTL value or TTL values of two time synchronization messages that were previously sent from the slave device to the master device are different, determining, by the slave device, a time adjustment based at least in part on the determination that the first and second TTL values are different; and
applying, by the slave device, the time adjustment to update the time of the slave device.

2. The method of claim 1, wherein determining that TTL values of two time synchronization messages that were previously sent from the slave device to the master device after different further comprises:
determining, by the slave device, that the first time synchronization message from the master device comprises a third TTL value that is associated with a third time synchronization message that was previously sent from the slave device to the master device, wherein the third TTL is indicative of a number of hops traversed by the third time synchronization message from the slave device to the master device; and determining, by the slave device, whether the third TTL value is different from a fourth TTL value that is associated with a fourth time synchronization message that was previously sent from the slave device to the master device, wherein the fourth TTL is indicative of a number of hops traversed by the fourth synchronization message from the slave device to the master device.

3. The method of claim 1, wherein applying the time adjustment to update the time of the slave device further comprises:
   determining, by the slave device, that the second TTL value is greater than the first TTL value; and
   in response to determining the second TTL value is greater than the first TTL value, decreasing, by the slave device, the time adjustment.

4. The method of claim 1, wherein decreasing the time adjustment further comprises:
   determining, by the slave device, a difference between the second TTL value and the first TTL value; and
   decreasing, by the slave device, the time adjustment in a proportion to the difference between the second TTL value and the first TTL value.

5. The method of claim 1, wherein applying the time adjustment to update the time of the slave device further comprises:
   determining, by the slave device, that the second TTL value is less than the first TTL value; and
   in response to determining the second TTL value is less than the first TTL value, increasing, by the slave device, the time adjustment.

6. The method of claim 1, wherein increasing the time adjustment further comprises:
   determining, by the slave device, a difference between the second TTL value and the first TTL value; and
   increasing, by the slave device, the time adjustment in a proportion to the difference between the second TTL value and the first TTL value.

7. The method of claim 1, further comprising:
   sending, by the slave device, a first control message to the master device, wherein the first control message comprises a request to determine whether the master device is capable of sending the first time synchronization message that comprises the first TTL value and the second TTL value; and
   upon receiving an acknowledgement message from the master device that indicates the master device is capable of sending the first time synchronization message, sending, by the slave device a second control message that comprises a request for the first time synchronization message that comprises the first TTL value and the second TTL value.

8. The method of claim 1 further comprising:
   determining, by the slave device, a first group of time values, wherein at least one of the time values is usable to determine a network propagation delay between the master device and the slave device;
   in response to determining that the second TTL value is different than the first TTL value, deleting, by the slave device, the group of time values;
   determining, by the slave device, a second group of time values, wherein at least one of the time values is usable to determine the network propagation delay between the master device and the slave device; and
   determining, by the slave device, the time adjustment based on the second group of time values only after determining that the second group of time values includes time values that were determined over a predetermined time interval.

9. The method of claim 1, further comprising:
   determining, by the slave device, a plurality of groups of time values, wherein at least one of the time values of each of the plurality of groups is usable to determine a network propagation delay between the master device and the slave device, wherein each of the plurality of groups includes time values determined in a different time interval of a plurality of time intervals;
   determining, by the slave device, an average time value for each of the plurality of groups based at least in part on the time values of each respective group of the plurality of groups; and
   in response to determining that the second TTL value is different than the first TTL value during one of the intervals of the plurality of time intervals, applying a weight, by the slave device, to the average time value of the group of time values that corresponds to the one of the intervals during which the slave device determined that the second TTL value is different than the first TTL value.

10. The method of claim 1, wherein applying the time adjustment to update the time of the slave device further comprises:
    determining, by the slave device, an offset that indicates a network propagation delay, wherein the offset is based at least in part on a difference between the first TTL value and the second TTL value; and
    setting, by the slave device, the time of an internal clock of the slave device based at least in part on the offset.

11. The method of claim 1, further comprising:
    in response to determining that the second TTL value is different than the first TTL value, sending, by the slave device a notification message to a computing device of an administrator to indicate that a change in network topology has occurred.

12. A network device comprising:
    a control unit having one or more hardware-based microprocessors;
    an interface that receives a first time synchronization message from a master device that comprises a first TTL value, wherein the first TTL value is indicative of a number of hops traversed by the first time synchronization message from the master device to the network device, and subsequently receives a second time synchronization message from the master device that comprises a second TTL value, wherein the second TTL value is indicative of a number of hops traversed by the second time synchronization message from the master device to the network device; and
    a timing module that, in response to determining that at least the second TTL value is different than the first TTL value or TTL values of two time synchronization messages that were previously sent from the network device to the master device are different determines a time adjustment based at least in part on the determination that the first and second TTL values are different, and applies the time adjustment to update the time of the network device.

13. The network device of claim 12,
    wherein the timing module determines that the first time synchronization message from the master device comprises a third TTL value that is associated with a third time synchronization message that was previously sent from the network device to the master device, wherein the third TTL is indicative of a number of hops traversed by the third time synchronization message from the network device to the master device; and wherein the timing module determines whether the third TTL value is different from a fourth TTL value that is associated with a fourth time synchronization message that was previously sent from the network device to the master device, wherein the fourth TTL is indicative of a number of hops traversed by the fourth synchronization message from the network device to the master device.

14. The network device of claim 12, wherein the timing module determines that the second TTL value is greater than the first TTL value; and wherein the timing module, in response to determining the second TTL value is greater than the first TTL value, decreases the time adjustment.

15. The network device of claim 12, wherein the timing module determines a difference between the second TTL value and the first TTL value; and wherein the timing module decreases the time adjustment in a proportion to the difference between the second TTL value and the first TTL value.

16. The network device of claim 12, wherein the timing module determines that the second TTL value is less than the first TTL value; and wherein the timing module, in response to determining the second TTL value is less than the first TTL value, increases the time adjustment.

17. The network device of claim 12, wherein the timing module determines a difference between the second TTL value and the first TTL value; and wherein the timing module increases the time adjustment in a proportion to the difference between the second TTL value and the first TTL value.

18. The network device of claim 12, wherein the interface sends a first control message to the master device, wherein the first control message comprises a request to determine whether the master device is capable of sending the first time synchronization message that comprises the first TTL value and the second TTL value; and wherein upon receiving an acknowledgement message from the master device that indicates the master device is capable of sending the first time synchronization message, the interface sends a second control message that comprises a request for the first time synchronization message that comprises the first TTL value and the second TTL value.

19. The network device of claim 12, wherein the timing module determines a first group of time values, wherein at least one of the time values is usable to determine a network propagation delay between the master device and the network device;

wherein the timing module, in response to determining that the second TTL value is different than the first TTL value, deletes the group of time values;

wherein the timing module determines a second group of time values, wherein at least one of the time values is usable to determine the network propagation delay between the master device and the network device; and wherein the timing module determines the time adjustment based on the second group of time values only after determining that the second group of time values includes time values that were determined over a predetermined time interval.

20. The network device of claim 19, wherein the timing module determines a plurality of groups of time values, wherein at least one of the time values of each of the plurality of groups is usable to determine a network propagation delay between the master device and the network device, wherein each of the plurality of groups includes time values determined in a different time interval of a plurality of time intervals;

wherein the timing module determines an average time value for each of the plurality of groups based at least in part on the time values of each respective group of the plurality of groups; and wherein the timing module, in response to determining that the second TTL value is different than the first TTL value during one of the intervals of the plurality of time intervals, applies a weight to the average time value of the group of time values that corresponds to the one of the intervals during which the network device determined that the second TTL value is different than the first TTL value.

21. The network device of claim 12, wherein the timing module determines an offset that indicates a network propagation delay, wherein the offset is based at least in part on a difference between the first TTL value and the second TTL value; and wherein the timing module sets the time of an internal clock of the network device based at least in part on the offset.

22. A non-transitory computer-readable medium comprising instructions that, when executed, cause one or more processors of a network device to:

receive a first time synchronization message from a master device that comprises a first TTL value, wherein the first TTL value is indicative of a number of hops traversed by the first time synchronization message from the master device to the network device;

subsequently receive a second time synchronization message from the master device that comprises a second TTL value, wherein the second TTL value is indicative of a number of hops traversed by the second time synchronization message from the master device to the network device;

in response to determining that at least the second TTL value is different than the first TTL value or TTL values of two time synchronization messages that were previously sent from the network device to the master device are different, determine a time adjustment based at least in part on the determination that the first and second TTL values are different; and apply the time adjustment to update the time of the network device.

23. A method comprising:

receiving, by a master device, a first synchronization message from a slave device that comprises a first TTL value, wherein the first TTL value is indicative of a number of hops traversed by the first time synchronization message from the slave device to the master device; and in response to receiving the first synchronization message, sending, by the master device and to the slave device, a second time synchronization message that includes the first TTL value and a second TTL value, wherein the second TTL value is stored within a TTL field of a message header of the second time synchronization message for decrementing at each of a number of hops traversed by the second time synchronization message from the master device to the slave device, Wherein the first TTL value and the second TTL value indicate to the slave device whether to perform a time adjustment based at least in part on the first and second TTL values being different.

24. The method of claim 23, further comprising:
receiving, by the master device, a first control message from the slave device, wherein the first control message comprises a request to determine whether the master device is capable of sending the first time synchronization message that comprises the first TTL value and the second TTL value; and
upon sending an acknowledgement message that indicates the master device is capable of sending the first time synchronization message, receiving, by the slave device a second control message that comprises a request for the first time synchronization message that comprises the first TTL value and the second TTL value.

25. The method of claim 24, further comprising:
determining, by the master device, that the second control message indicates rate at which to send time synchronization messages to the slave device; and
sending, by the master device, time synchronization messages at the indicated rate to the slave device.

26. The method of claim 23, wherein the TTL field is a first field, wherein the second time synchronization message comprises the message header, wherein tire message header comprises the first field and a second field, and wherein the first field includes the first TTL value and the second field includes the second TTL value.

27. The method of claim 23,
wherein the master device receives the first synchronization message from the slave device using Precision Time Protocol, and
wherein the master device sends the second time synchronization message that includes the first TTL value and a second TTL value using Precision Time Protocol.

28. A network device comprising:
a control unit having one or more hardware-based microprocessors;
an interface that receives a first synchronization message from a slave device that comprises a first TTL value, wherein the first TTL value is indicative of a number of hops traversed by the first time synchronization message from the slave device to the network device; and
a timing module that, in response to receiving the first synchronization message, sends, to the slave device, a second time synchronization message that includes the first TTL value and a second TTL value, wherein the second TTL value is stored within a TTL field of a message header of the second time synchronization message for decrementing at each of a number of hops traversed by the second time synchronization message from the network device to the slave device wherein the first TTL value and the second TTL value indicate to the slave device whether to perform a time adjustment based at least in part on the first and second TTL values being different.

29. The network device of claim 28,
wherein the interface receives a first control message from the slave device, wherein the first control message comprises a request to determine whether the network device is capable of sending the first time synchronization message that comprises the first TTL value and the second TTL value; and
wherein the interface, upon sending an acknowledgement message that indicates the network device is capable of sending the first time synchronization message, receives a second control message that comprises a request for the first time synchronization message that comprises the first TTL value and the second TTL value.

30. The network device of claim 29,
wherein the timing module determines that the second control message indicates rate at which to send time synchronization messages to the slave device; and
wherein the interface sends time synchronization messages at the indicated rate to the slave device.

31. The network device of claim 28, wherein the TTL field is a first field, wherein the second time synchronization message comprises the message header, wherein the message header comprises the first field and a second field, and wherein the first field includes the first TTL value and the second field includes the second TTL value.

32. The network device of claim 28,
wherein the network device receives the first synchronization message from the slave device using Precision Time Protocol, and
wherein the network device sends the second time synchronization message that includes the first TTL value and a second TTL value using Precision Time Protocol.

33. A non-transitory computer-readable medium comprising instructions that, when executed, cause one or more processors of a network device to:
receive a first synchronization message from a slave device that comprises a first TTL value, wherein the first TTL value is indicative of a number of hops traversed by the first time synchronization message from the slave device to the network device; and
in response to receiving the first synchronization message, send, to the slave device, a second time synchronization message that includes the first TTL value and a second TTL value, wherein the second TTL value is stored within a TTL field of a message header of the second time synchronization message for decrementing at each of a number of hops traversed by the second time synchronization message from the network device to the slave device wherein the first TTL value and the second TTL value indicate to the slave device whether to perform a time adjustment based at least in part on the first and second TTL values being different.

34. A network system comprising:
a network that includes:
a master device having one or more hardware-based microprocessors;
a slave device having one or more hardware-based microprocessors,
wherein the slave device includes:
an interface to receive a first time synchronization message from the master device that comprises a first TTL value, wherein the first TTL value is indicative of a number of hops traversed by the first time synchronization message from the master device to the slave device and subsequently receive a second time synchronization message from the master device that comprises a second TTL value, wherein the second TTL value is indicative of a number of hops traversed by the second time synchronization message from the master device to the slave device;
a control unit that, in response to determining that at least the second TTL value is different than the first TTL value or TTL values of two time synchronization messages that were previously sent from the slave device to the master device are different, determines a time adjustment based at least in part on the determination that the first and second TTL values are different, and applies the time adjustment to update the time of the slave device;
wherein the master device includes:
an interface that receives a first synchronization message from the slave device that comprises a first TTL value, wherein the first TTL value is indicative of a number of hops traversed by the first time synchronization message from the slave device to the master device; and
a control unit that sends, to the slave device, a second time synchronization message that includes the first TTL value and a second TTL value, wherein the second TTL value is usable by the slave device to determine a number of hops traversed by the second time synchronization message from the master device to the slave device.

\* \* \* \* \*